United States Patent
Chitouras

[11] Patent Number: 5,876,541
[45] Date of Patent: *Mar. 2, 1999

[54] METHOD FOR RESEALING A TONER CARTRIDGE

[76] Inventor: Costa G. Chitouras, 10 Packard Ave., Somerville, Mass. 02173

[*] Notice: The term of this patent shall not extend beyond the expiration date of Pat. No. 5,370,761.

[21] Appl. No.: 707,857

[22] Filed: Sep. 9, 1996

Related U.S. Application Data

[63] Continuation-in-part of Ser. No. 547,259, Oct. 24, 1995, abandoned, which is a continuation-in-part of Ser. No. 285,959, Aug. 4, 1994, Pat. No. 5,460,674, which is a continuation of Ser. No. 50,412, filed as PCT/US91/09223 Dec. 6, 1991, Pat. No. 5,370,761, which is a continuation-in-part of Ser. No. 638,182, Dec. 7, 1990, abandoned.

[51] Int. Cl.[6] ................................................. B32B 35/00
[52] U.S. Cl. ....................... 156/94; 222/DIG. 1; 399/106
[58] Field of Search ............................ 156/94; 399/106, 399/109; 222/DIG. 1; 141/363, 364

[56] References Cited

U.S. PATENT DOCUMENTS

| | | |
|---|---|---|
| 1,407,692 | 2/1922 | Kuhn et al. . |
| 3,325,332 | 6/1967 | Cleereman . |
| 3,897,296 | 7/1975 | Waldrum . |
| 3,999,654 | 12/1976 | Pollack .................................... 206/216 |
| 4,139,760 | 2/1979 | Banks . |
| 4,342,282 | 8/1982 | Yamashita et al. ...................... 118/657 |
| 4,504,353 | 3/1985 | Ford ........................................ 156/499 |
| 4,538,651 | 9/1985 | Lykins ........................................ 141/1 |
| 4,615,608 | 10/1986 | Mizutani ............................... 355/3 DD |
| 4,862,210 | 8/1989 | Woolley ................................... 355/245 |
| 4,930,684 | 6/1990 | Patterson ................................. 222/325 |
| 4,933,036 | 6/1990 | Shaposka et al. . |
| 4,971,639 | 11/1990 | Quinn et al. . |
| 4,981,218 | 1/1991 | Ban et al. ............................... 206/633 |
| 5,080,745 | 1/1992 | Paull ....................................... 156/247 |

(List continued on next page.)

FOREIGN PATENT DOCUMENTS

| | | |
|---|---|---|
| 0 627 672 A2 | 6/1992 | European Pat. Off. . |
| WO 92/10404 | 6/1992 | WIPO . |

OTHER PUBLICATIONS

Letter dated Jun. 10, 1996 from Walter W. Duft, Esq. to Steven Goldberg, Esq.
Paull, "The Truth About OEM Type Toner Bin Seals," *Recharger*, pp. 12–13, Aug. 1991.
Future Graphics advertisement, *Recharger*, Aug. 1991.
East Coast Heat Seal advertisement, *Recharger*, Aug. 1991.
Recycling Concepts advertisement, *Recharger*, May 1994.

*Primary Examiner*—Daniel Stemmer
*Attorney, Agent, or Firm*—Hamilton, Brook, Smith & Reynolds, P.C.

[57] ABSTRACT

An original equipment type seal for recharged toner cartridges can be installed without splitting the cartridge itself, by screening a border of "hot-melt" type adhesive, preferably wax-based, onto a strip of polyester, the adhesive being capable of softening or melting at a temperature above the softening or coagulating point of the toner powder itself, but below the softening points of the plastic components of the cartridge. The polyester seal is inserted into the cartridge with the aid of a room temperature or even cold, metallic insertion tool, preferably made of a high magnetic permeability steel. Heating this cold tool, or subsequently inserting a hot tool, will cause the adhesive to melt and seal the cartridge. In those areas of the cartridge where there is little or no significant pressure to assure firm contact with the adhesive, the insertion of a "pressure tool" incorporating a magnet, into the fill hole in the cartridge, where the magnet portion is brought in close proximity to the steel insertion tool, allows one to push and/or pull the insertion tool surface so as to bring about an intimate contact between the adhesive on the seal and cartridge surfaces to be sealed. The utilization of wax-based adhesives and a cold, and then heated, insertion tool, together with a magnetic pressure tool is the preferred embodiment, but the use of other hot-melt-type adhesives and insertion tools are possible within the purview of this invention.

16 Claims, 5 Drawing Sheets

5,876,541
Page 2

U.S. PATENT DOCUMENTS

| | | | |
|---|---|---|---|
| 5,126,720 | 6/1992 | Zhou et al. | 340/572 |
| 5,184,182 | 2/1993 | Michlin | 355/260 |
| 5,258,814 | 11/1993 | Davies | 355/260 |
| 5,267,003 | 11/1993 | Grappiolo | 355/260 |
| 5,282,003 | 1/1994 | Michlin | 355/260 |
| 5,296,902 | 3/1994 | Michlin | 355/260 |
| 5,335,831 | 8/1994 | Foster | 222/325 |
| 5,345,207 | 9/1994 | Gebele | 335/298 |
| 5,370,761 | 12/1994 | Chitouras | 156/94 |
| 5,460,674 | 10/1995 | Chitouras | 156/94 |
| 5,531,846 | 7/1996 | Miraglia | 156/94 |
| 5,534,836 | 7/1996 | Schenkel et al. | 335/284 |

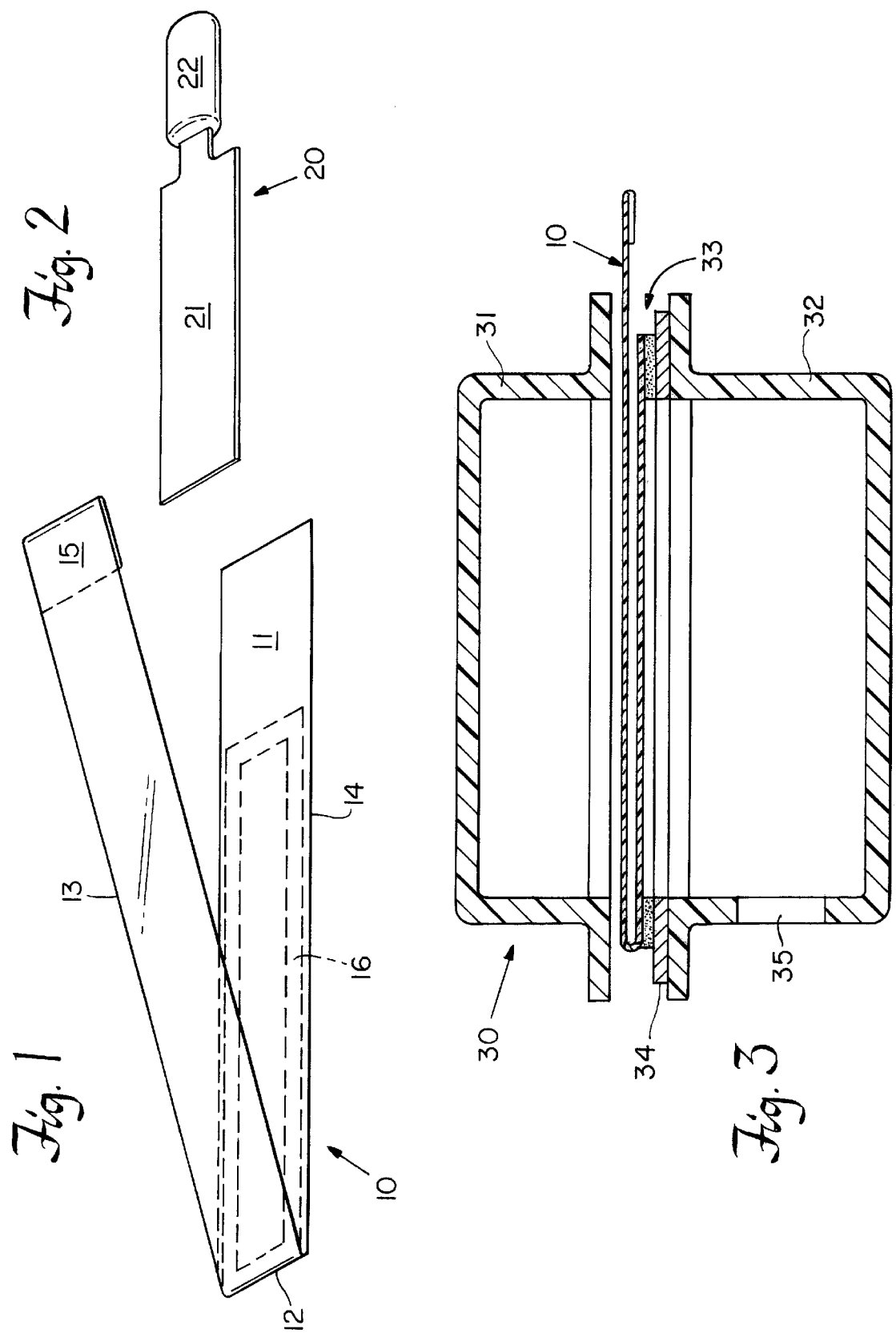

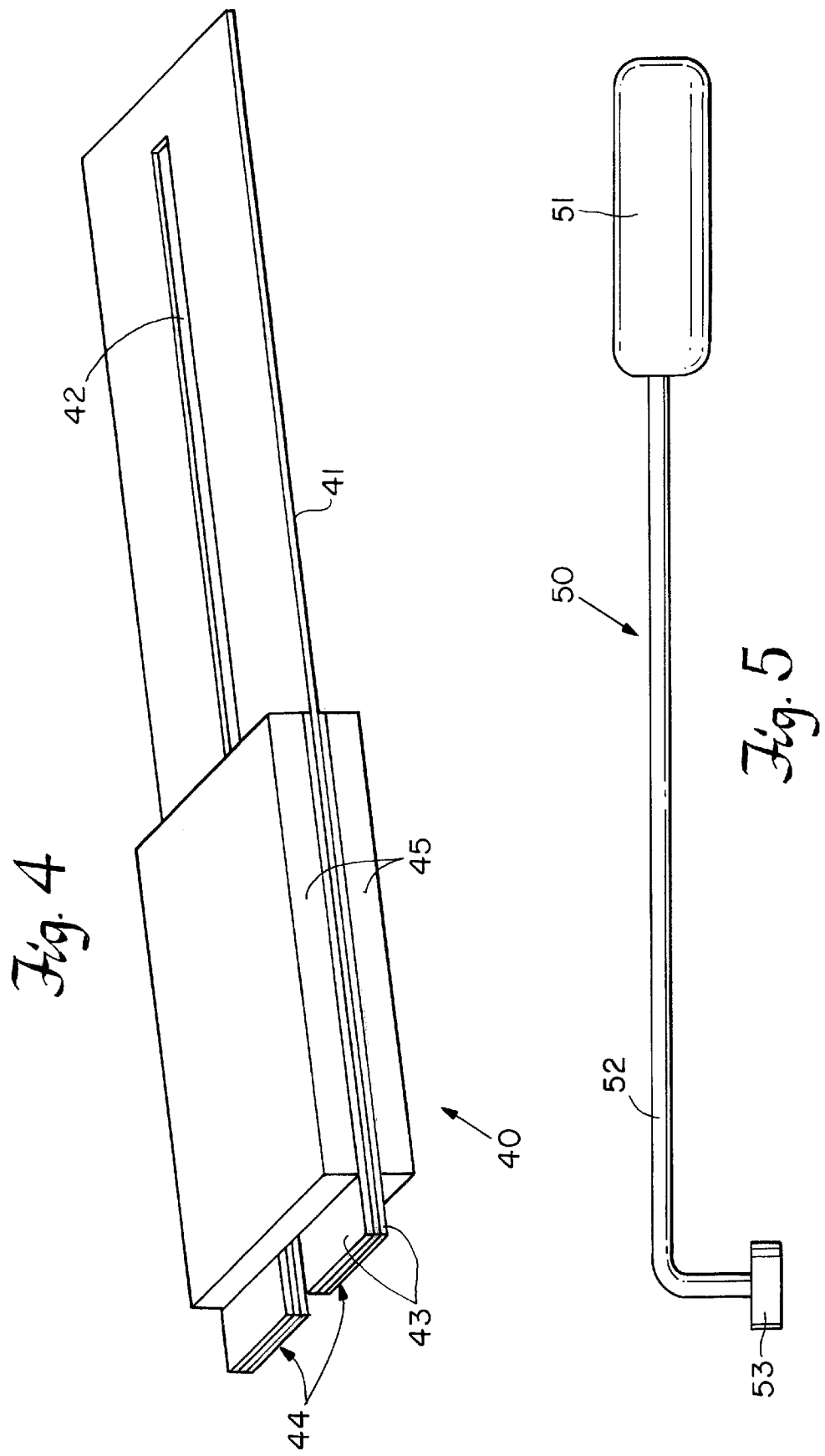

METHOD FOR RESEALING A TONER CARTRIDGE

RELATED APPLICATIONS

This application is Continuation-in-Part Application of U.S. patent application Ser. No. 08/547,259, filed Oct. 24, 1995, now abandoned, which is a Continuation-in-Part Application of U.S. patent application Ser. No. 08/285,959, filed Aug. 4, 1994, now U.S. Pat. No. 5,460,674, which is a Continuation of U.S. patent application Ser. No. 08/050,412, filed on May 14, 1993, now U.S. Pat. No. 5,370,761, which is a National Phase Application of PCT Application No. PCT/US91/09223, filed on Dec. 6, 1991, which is a Continuation-in-Part Application of U.S. patent application Ser. No. 07/638,182, filed on Dec. 7, 1990, now abandoned, all of which are incorporated herein by reference in their entirety.

BACKGROUND OF THE INVENTION

This invention relates generally to a method for resealing toner cartridges, such as the type used in laser printers, especially those in which the toner cartridge contains not only the toner or powder but also the ionizing means and photoreceptor drum in one package. The original seal design lends itself to lower cost maintenance of the printer or copying machine but significantly higher costs for replacing consumed toner.

While it is easy to remove the cartridge in a typical machine, and in fact this must be done in order to install a new cartridge, one would think most people would opt to refill their cartridges by adding toner themselves. Such is not the case, however, with most office personnel avoiding this task, if for no reason other than the difficulty of containing the inadvertent spilling of some of the toner, and the resultant soiling of hand, clothing and immediate surroundings. The spilling of toner is also the reason a seal must be provided if the cartridge is to be shipped or held in any position except in the normal or upright position. A simple, stiff, push-in, pull-out plastic seal is sometimes adequate, especially if hand or local delivery of the refilled cartridge is contemplated. However, this type of seal will not prevent toner spilling under even normal handling of a well packaged toner cartridge handled by postal or shipping organizations.

A second and very important marketing reason that a thick, single piece of plastic is not desired in refilled cartridges is simply the fact that users of these cartridges are familiar with the original manufacturer's pull-tab system and tend to be reluctant to switch to an off-brand component in their expensive and well-performing printer.

There is one method intended to nearly duplicate the original cartridge sealing system. It requires the splitting of the shell of the cartridge, often requiring extensive reworking of the mating surfaces, replacing and cementing a new styrene or similar gasket which provides the surface to which the new pull-tab seal is ultimately adhered to, and the assembly, via pressure sensitive adhesive of a "U" shaped, thin plastic seal. The split shells of the cartridge are then recemented and other, time-consuming adjustments on other components of the cartridge are performed to make it functional. Because of the high cost of splitting and reassembling these cartridges and the inevitable deterioration of the appearance of the finished toner cartridge, other ways have been sought for refilling these cartridges, to take full advantage of the potential price differential of new cartridges and those that have been refilled. Except in rare cases, the other expensive components that make up a complete toner cartridge are, in general, in excellent condition and capable of performing well for at least a few refillings of the cartridge. Also, the lifetime of a printer and use thereof is such that the costs of toner cartridges, in general, often exceed the cost of the printer.

To minimize costs and improve appearance, various attempts have been made to provide a U-shaped, insertable seal, that is close to the original manufacturer's design. There are ways others have developed and attempted to use, with varying degrees of success. Most have the common elements of using two thin plastic films, folded in a somewhat complex, but generally "U" shape, inserting the films into the unseparated cartridge with the aid of an insertion tool to push the two plastic films into the slot from whence the first plastic film, covering the pressure-sensitive-coated second film (the actual seal), is subsequently pulled. The use of two films, one covering the adhesive layer on the second film is necessitated by the fact that the adhesive coated film cannot be slid into the cartridge without damaging the film and adhesive layer.

A somewhat common problem associated with this sealing method is the complexity of folding the two-piece seal in just the right fashion and accuracy, without contaminating the pressure-sensitive adhesive generally used, and, upon pulling the cover film, to expose the adhesive-coated second film to the substrate to which it is to be adhered, without any wrinkles, other blemishes, or residual toner adversely affecting the sealing process. Another very common problem occurs when the pressure-sensitive adhesive prematurely makes contact and adheres at some point to the substrate so that the seal cannot be properly seated and must be removed, generally destroying the seal and making it unusable. In a worst case scenario, if more than a very small amount of pressure-sensitive adhesive makes improper contact with the substrate and the seal must be pulled out to replace it, it is very likely that the seal itself will rip when an attempt is made to remove the misaligned seal within the cartridge, making it extraordinarily difficult, if not impossible, to remove the torn section of seal within the cartridge without disassembling the cartridge. The tearing problem in this process can be minimized if one uses plastic film material like DuPont's Tyvek™ for the seal material, but then the seal no longer has the look and feel of the original manufacturer's seal, a characteristic of significant value in the marketplace.

SUMMARY OF THE INVENTION

The invention comprises a method for resealing a toner cartridge, having its original seal removed, whereby the toner cartridge can be recharged with toner and resealed for shipping, without splitting the toner cartridge assembly, and utilizing a seal essentially identical in appearance to the original equipment manufacturer's design. The method comprises sliding a folded plastic strip, having the shape of the original sealing strip and which has a hot-melt-type adhesive, preferable wax-based, on a portion of its lower outer surface in a pattern conforming to the sealing area of the original seal, into the sealing area within the cartridge, with the aid of an insertion tool. This insertion tool should be at room temperature or colder, depending on the particular adhesive chosen for the seal, and whose blade, which is inserted within the folded plastic strip, is preferentially made of a high magnetic permeability steel. After the seal is inserted, the insertion tool is heated, or, the cold insertion tool, with the seal left within the cartridge, is removed and replaced by another, heated insertion tool. The temperature of the heated insertion tool is chosen to be sufficient to cause the hot-melt adhesive to soften or melt, but not high enough to damage the cartridge surfaces themselves. During this period when the insertion tool, seal and adhesive are cooling, another tool, incorporating a magnet portion, may be inserted within the fill hole of the cartridge and brought in close proximity to the steel insertion tool, providing a means for either pushing or pulling on the insertion tool so as to bring about an intimate contact between the adhesive on the seal and the cartridge surfaces to be sealed. Subsequently, the magnet tool and insertion tool are withdrawn, having caused the sealing surfaces, thereafter forming an effective seal.

Another embodiment of the invention includes sliding a folded plastic strip having an upper portion and a lower portion and a shape corresponding to the original seal with the cartridge. The folded plastic strip has an adhesive on its outer surface at least corresponding with the sealing area of the original seal. A blade of a sealing tool is inserted between the upper portion and lower portion of the folded plastic strip. A magnetic force is applied to the blade wherein the blade applies a force to the plastic strip through the adhesive to the sealing area and the adhesive bonds to a sealing surface of the cartridge, thereby resealing the toner cartridge.

A further embodiment of the invention includes sliding a folded plastic having an upper portion and a lower portion and a shape corresponding to the original seal with the cartridge. The folded plastic strip has an adhesive on its outer surface at least corresponding with the sealing area of the original seal. A blade of a sealing tool is inserted between the upper and lower portions of the folded plastic strip. A magnetic force is applied to the blade wherein the blade applies a force through the adhesive to a sealing surface of the cartridge. The blade is heated to a temperature sufficient to cause the hot-melt adhesive to soften. The hot-melt adhesive is cooled, whereby the adhesive bonds to the sealing surface of the cartridge, thereby sealing the toner cartridge.

This method for resealing toner cartridges provides for the recharging of toner cartridges at lower cost and greater convenience and reliability than is presently possible with resealing methods. Thus, the user can be provided with a refilled cartridge which is essentially identical in appearance to the manufacturer's original seal, including the peripheral application of adhesive on the seal.

BRIEF DESCRIPTION OF THE FIGURES

FIG. 1 is a schematic illustration of a folded plastic strip having an adhesive pattern thereon and suitable for forming a seal according to the method of this invention.

FIG. 2 is a schematic illustration of an insertion and/or sealing tool useful for inserting the plastic strip and forming a seal according to the method of this invention.

FIG. 3 is a cross-sectional view of a toner cartridge illustrating a seal formed by the resealing method of this invention.

FIG. 4 is a schematic illustration of the preferred insertion tool for high production recharging operations, where a stiff and reliably-heated tool is desired, and which also provides a method for pulling or pushing the seal against the cartridge gasket when only one side of the seal is accessible.

FIG. 5 is a schematic illustration of the preferred tool for providing pressure between the seal (and its adhesive) and the gasket within the cartridge, regardless of whether the seal must be pushed or pulled against the gasket to effect a tight seal.

DETAILED DESCRIPTION OF THE INVENTION

Figure 6:
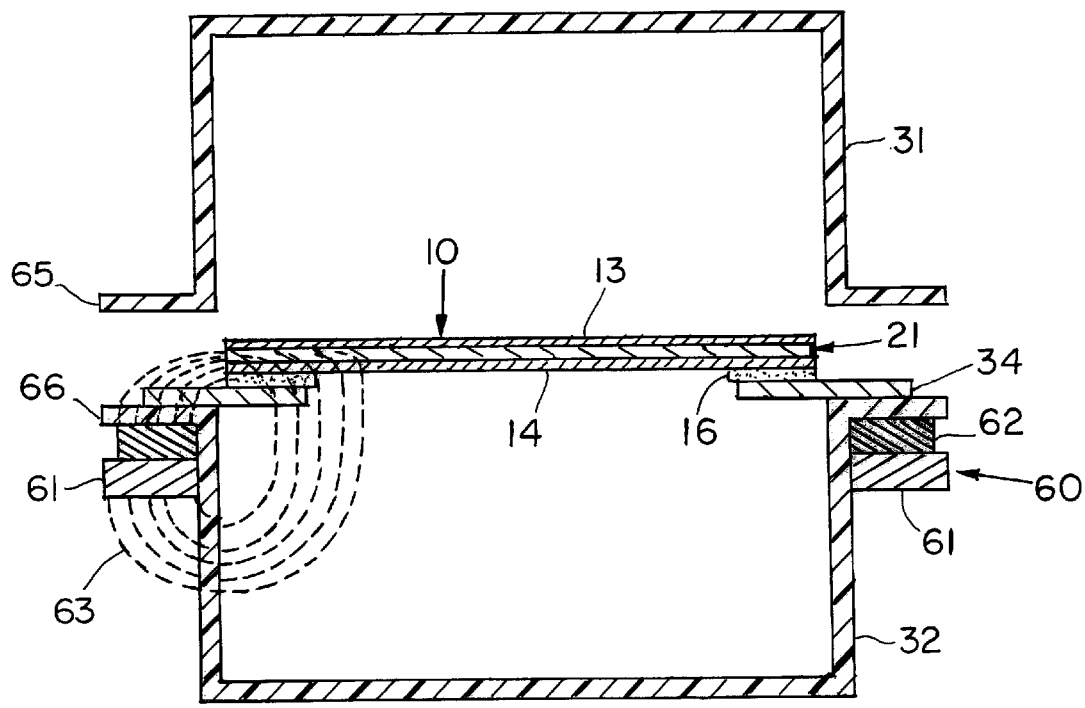
FIG. 6 is an end cross-sectional view of a second toner cartridge illustrating a seal formed by another embodiment of the resealing method of this invention.

The above features and other details of the method and apparatus of the invention will now be more particularly described with reference to the accompanying drawing and pointed out in the claims. The same number in different figures represents the same item. It will be understood that the particular embodiments of the invention are shown by way of illustration and not as limitations of the invention. The principal features of this invention can be employed in various embodiments without departing from the scope of the invention.

Referring now to FIG. 1, it can be seen that a sealing material 10 is formed from an elongated plastic strip 11. The elongated plastic strip 11 is folded back upon itself at fold 12. This produces an upper leg 13 and a lower leg 14. Upper leg 13 can be deliberately made longer than lower leg 14 (as shown) so that a portion at one of its terminal ends can be folded over upon itself and sealed, for example, using a foamed, pressure sensitive adhesive, thereby forming pull-tab 15, which is useful in withdrawing the seal ultimately formed according to this method. The upper surface of pull-tab 15 could be embossed with information, such as directions for removing the seal, or with a company logo or other information, or could have a label affixed thereto.

The hot-melt adhesive 16 is applied to the outside surface of the shorter leg 16. The adhesive is applied in a pattern conforming to the cartridge surfaces to be sealed. A typical rectangular pattern starting at fold 12 and running along the perimeters of the shorter leg 14 is illustrated.

As will be understood, the sealing material 10 can be designed in a wide variety of shapes, thicknesses and adhesive patterns, to achieve a proper seal for any given set of circumstances. As one illustration only, the following dimensions would be approximately correct to reseal toner cartridges such as those supplied with either the Canon Corporation's LBP-CX or the LBP-SX laser engines, commonly referred to in the trade as the CX or SX engines, and which utilize the CX and SX seals, respectively. To reseal such toner cartridges, a plastic film having a total length of about twenty-three inches (about 58.4 cm) and a width slightly under two inches (about 5 cm) and a thickness of approximately three mils (about 0.0076 cm) could be employed. The exact dimension, of course, will depend on the seal involved, e.g., a CX or SX seal. This plastic film would be folded to provide an upper leg 13 of about 13 inches (about 33 cm) and a lower leg 14 of about 10 inches (about 25 cm). The terminal portion of upper leg 13 would be folded back upon itself for a length of about one inch (about 2.5 cm) to form a pull tab. The adhesive 16 would be applied beginning at the fold 12 and running along the perimeters of lower leg 14 for about nine inches (about 22.8 cm). At about nine inches (about 22.8 cm), a thin strip of the adhesive would be applied parallel to fold 12 thereby forming a continuous rectangle of the adhesive. The width of the adhesive would be about 0.25 inches (about 0.6 cm), starting preferably at about 10 mils (about 0.025 cm) from the outside edges of lower leg 14. The thickness of adhesive could typically be from about 1 to 5 mils (about 0.0025 to 0.0125 cm).

Plastic strip 11 can be formed from a wide variety of polymer materials. Examples are polyester film, spun-bonded polyethylene (a useful version being DuPont's Tyvek™), or other similar materials.

The nature and choice of adhesives is an important aspect of this invention. In general, most hot-melt adhesive application temperatures exceed the softening or even melting temperatures of some of the plastics used in the manufacture of cartridges, and are therefore, not useful. It has been found, however, that waxes, preferably modified to optimize certain characteristics, meet the requirements necessary for adhering a polyester (or other plastic seal material), including the subsequent removal and cleaning of the cartridge when additional fillings after the first are attempted. Furthermore, wax-based adhesives can readily be screened onto the plastic seal, unlike most other hot-melt adhesives, which can only be economically laid down in a continuous layer via knife-over-roller or similar coating machines, thereby precluding a seal appearance similar to that of the original manufacturer's. The wax characteristics that are preferred for use as adhesives in this invention are as follows:

(a) a softening temperature above 130° F. (about 55° C.); and (b) a melt temperature between about 140° and 180° F. (about 60° and 82° C.), and preferably approximately 150° F. (about 65° C.).

Some preferred wax adhesives are those that have been modified to enhance, if not maximize, their tacky or sticky surface characteristic, and which coincidentally enhances the smooth or "fluid" pull of the seal and extreme low-temperature storage and shipping reliability. Most importantly, such a characteristic provides a form of self sealing, with just the slightest pressure required to form a seal, even when the heat source has been removed, and unlike the other, far more common, hot-melt adhesives in which heat and pressure simultaneously must be provided to provide a reliable sealing action.

A softening temperature above about 130° F. (about 55° C.) is important because original toner cartridge manufacturers recommend maximum storage temperatures of about 104° F. (about 40° C.). At such elevated temperatures, it is necessary that the seal ultimately provided by the method of this invention retain adequate strength to perform its sealing function.

An upper melt temperature limit of about 180° F. (about 82° C.) is below the softening temperature or, more accurately, distortion temperature of the cartridge components, and even if it is close, the method in which heat is applied precludes any significant heat energy being transferred through the plastic seal, melting the adhesive, and then distorting the gasket or cartridge components.

Making the adhesive tacky minimizes the necessity to achieve and maintain a precise temperature with the heated insertion tool (to be discussed below) for making an adhesive bond and yet not melting the adhesive which can cause other problems. It is preferred to use a heated tool to guarantee proper sealing (a necessity when a polyolefin or similar hot-melt adhesive, with no significant tack, is used), if for no other reasons that it is so inexpensive an operation, and it always enhances and never adversely affects the bond between the adhesive and the gasket. However, it is possible to increase the tackiness of the wax so that it forms an adequate bond without the application of heat, but at the expense of greater difficulty in inserting the seal. Some waxes that have performed well in this application are designated as number 807, supplied by Allcon, Inc. of Lawrence, Mass., and number 7331, supplied by Roger A. Reed, Inc. of Reading, Mass.

The application of the above indicated adhesives can be carried out with the use of a heated, stainless steel screen utilized in a "silk screen" process. The screen is conveniently heated with electrical energy and the low temperature of, say 150° F. (about 65° C.) is convenient, practical and safe. By adjustments in temperature of the screen, and the usual adjustments of squeegee pressure and screen sizing (80 mesh stainless steel screen has performed well in order to affect a lay-down thickness of 1 to 5 mils (about 0.0025 to 0.0125 cm), in contrast to the 200 to 300 mesh screen usually used in typical silk screen operations), the suggested 3 mils (plus or minus) (about 0.0076 cm) of adhesive application are readily controlled. (In cartridge structures in which the seal is fully supported or encapsulated after insertion, the adhesive thickness can be greatly reduced.) The Autoroll Machine Corporation of Middleton, Massachusetts markets an M25 Semi-Automatic Universal Screen Printer with custom vacuum hold down and heated screen for adhesive application. This machine can readily hold the positional accuracy desired and the production rate required for a low cost sealing system.

Referring to FIG. 2, an insertion and/or sealing tool 20 is illustrated. Insertion tool 20 contains a flat blade 21 with a handle 22 mounted thereon.

Preferably, blade 21 is made of a high-magnetic-permeability stainless or spring steel, because of the high strength, outstanding heat capacity and transfer properties of these metals, coupled with the ability to magnetically attract this blade structure in the method taught hereinafter so as to enhance the sealing operation. In a typical example, the thickness of blade 20 would be about 20 mils (about 0.05 cm) and the blade would have a length of about 20 inches (about 50 cm) and a width of about 1.9 inches (about 4.8 cm) to be employed with a seal having the dimensions specifically illustrated above.

Either or both the insertion tool 20 and/or the seal 10 may be cooled to a low temperature, e.g., from 25° to 40° F. (about −4° to 4° C.) (or even well below freezing, which occur when using compressed gasses), depending on the room temperature and humidity at the particular moment, but it is not a critical condition, with the criterion being the hardening and/or stiffening of the adhesive and, consequently, great reduction of tackiness in the case of a high-tack wax adhesive and the deposition of condensed moisture and/or "ice" formation to allow the seal to slide into the cartridge. Specifically, a cooled tool 20, held by handle 22, is enveloped by seal 10. For convenience, the handle 22 may be designed so that it holds the two ends of the seal 10. The sliding action required in inserting the seal can be facilitated by cooling either or both the seal and the insertion tool or, alternately, incorporating a volatile or blooming slip agent in the adhesive formulation as a lubricant for the adhesive surface of the seal.

FIG. 3 is a simplified cross section of a toner cartridge 30 with the upper section 31 (usually housing the corona charging unit, doctor blade and donor roll and photoreceptor drum) and the lower section 32 carrying the toner. The cooled, waxed, and/or lubricated polyester seal quite readily slides into slot 33, and should be pushed until firmly seated. The interior of the cartridge, and particularly, the surfaces to be contacted by the adhesive should be clean, to maximize adhesion. Residual toner, especially within the tracks that the seal enters, is particularly significant in reducing the adhesion of pressure-sensitive adhesives, but with a much smaller effect on the hot-melt-type adhesives specified in this invention. However, even this problem essentially disappears when the cool tool is removed and another, heated, tool is inserted.

This insertion tool 20 is heated to a temperature to soften the adhesive between the short seal leg 14 (FIG. 1) and the cartridge gasket 34 to which the seal is to be adhered. It has been found that heating the insertion tool to a temperature of 140° to 180° F. (about 60° to 82° C.), coupled with the fact that the insertion tool has a fixed mass, and acting much like a thermal impulse heater with a fixed, controllable temperature and quantity of heat available to melt the adhesive, guarantees a consistent and controllable heat energy source for softening the adhesive to any level of viscosity desired, without any hot-spots or other anomalies. The ideal temperature to bring the adhesive to is that which maximizes adhesion when the wax cools, but not allowing the adhesive to run. This characteristic, for the preferred waxes indicated in this invention, occurs at the softening point, in contrast to most, if not all of the typical hot-melts (polyurethanes, polyamides, polyesters, polyolefins, vinyls, etc.) where little adhesion occurs at the softening points, and essentially none at temperatures in the vicinity of 150° F. (about 65° C.).

The process of softening an otherwise already tacky adhesive serves two additional purposes besides maximizing adherence. The first is to allow minor displacements of the adhesive to compensate for slight irregularities in its application to fill in hairline cracks in the adhesive or even gasket (brought about by previous recharging efforts), waviness within the cartridge components (the polyester seal and insertion tool are for all practical purposes perfect), and to compensate for irregularities in applying pressure on the gasket and against the adhesive in that area of the seal that is not restrained between two well defined surfaces of the cartridge. This latter action can be performed by inserting a narrow wooden or similar spatula or equivalent product through fill hole 35 and running it along the underside of gasket 34, which is not in intimate contact with the seal (CX version) resulting in an immediate bonding of gasket 34 to the seal 10.

The second purpose served by softening the adhesive, when a thicker, 2 to 5 mils (about 0.005 to 0.012 cm) rather than 1 mil (about 0.0025 cm) layer of adhesive is used, is the encapsulation of residual toner on the surface of the gasket to which the wax must adhere. Experience with the use of "hard" adhesives (such as pressure-sensitive adhesives) indicates that little adhesion occurs at the surfaces contaminated with toner particles and that no possible opening, track or other discontinuity is tolerable in the integrity of the adhesive bond, in view of the extraordinary small size of toner particles, if toner leakage is to be eliminated.

The heated insertion tool 20 may be removed immediately after the use of the wooden spatula. The heat transfer from the metallic insertion tool is almost instantaneous, and well within the time it takes to apply pressure with the spatula. Furthermore, the adhesive quality of the softened and now cooling wax is more than adequate to remain adhered. (With other, more traditional hot-melt adhesives, that have low-tack surfaces, the heated or heatable insertion tool would normally remain in position until the hot-melt adhesive melts and cools.) Removing the insertion tool completes the operation of inserting the seal. The process of filling and sealing the fill hole, and any other adjustments desired or required are in the public domain and not a part of this invention.

There is a very significant economic advantage to the use of the adhesives and methods taught in this invention and that is the ease in which cartridges, once filled utilizing the sealing method herein described, may be refilled. In use, the cartridge is opened by pulling on the indicated pull-tab. It is possible that whatever adhesive system is used, some of the adhesive may remain within the cartridge and specifically on the gasket surface, to which another seal is to be cemented in a second or subsequent refilling. The adhesive system described in this invention has the significant advantage of being easily cleaned or removed from the gasket surface by one or the combination of these two methods.

By replacing the polyester seal with an absorbent paper, for example, paper similar to that used in grocery bags, and using the heated insertion tool, this time heated to a temperature equal to the melting point of the adhesive, and inserting this combination of paper and tool into the seal slot, in a back and forth motion, will clean any residual adhesive on the gasket. Naturally, this process may be repeated more than once if necessary. (No significant adhesive must be left on the surface facing the gasket surface to be cemented or else the inserted second seal may be adhered with both of its legs, preventing peeling of the seal.) If additional cleaning is desired, dipping the paper into a solvent and using a room temperature insertion tool, prior to inserting the tool, as above, will dissolve and remove any remaining residue of the adhesive. However, not any solvent will do, for not only must the adhesive be dissolved, but the solvent must not attack and solvent-weld the gasket 34 (FIG. 3) to the upper section 31 (FIG. 3). It has been found that, for the wax adhesives indicated above, a combination of solvents serve this purpose well, such combination being available from Key Polymer Corporation of Lawrence, Mass. as their product C1-141.

Cartridges have been repeatedly refilled with the desirable result that the pull-force required to break the initial bonding of the seal and gasket at the fold 12 (FIG. 1) is reasonable and consistent. Moreover, the fact that the adhesives recommended in this invention are "soft" in contrast to brittle, results in smooth, fluid-like pull action when the customer pulls the seal. So important is this pull-force action that Canon has patented a method (U.S. Pat. No. 4,981,218) for controlling these forces by means of a controlled adhesive pattern.

The ultimate test of the value of this sealing method, quite independent of convenience and low cost, is performance. The test method used to determine the structural integrity of this sealing method was to install seals in a series of cartridges, with some units having a "perfect" application of adhesive, and others having various "defects", from very narrow adhesive line widths, i.e. not 0.25 inches (about 0.635 cm) wide but 0.0625 inches (about 0.16 cm), etc., to units that had a minor break in the continuity of the adhesive line. These units were filled with toner and thirty were subjected to five minutes of tumbling action in a commercial dryer with the heat turned off. All units were packed in regular shipping boxes, with a nominal amount of packing material, to simulate the expected commercial package. All units passed this test, except one having a large gap in the perimeter of the adhesive line. In other words, even minor defects in adhesive application presented little problem, because the sealing method described herein allows for a self repair via repositioning of the adhesive to take place when the heated insertion tool is used, especially when thicker laydowns of adhesive, about 2 to 5 mils (about 0.005 to 0.012 cm), are screened onto the seal. Even when more traditional hot-melt adhesives, other than waxes, are used, repair to a "leaky" cartridge may be possible utilizing the same technique of reinserting a heated or heatable tool and allowing subsequent cooling.

A preferred embodiment of this invention has been described above as providing a method that may be used by small volume rechargers or those with a limited capital equipment budget. For those large scale manufacturers of recharged cartridges, modifications to the preferred embodiment may take the form of cooling the insertion tool and/or seal via cold plates, air, or compressed gas, such as carbon dioxide, and in the event hot-melt adhesives, such as polyolefin, are used as the adhesive, compounding such adhesives with blooming slip agents or made non-blocked to initially exhibit low coefficient of friction. Furthermore, "lubrication" of the seal, regardless of its construction, prior to insertion, which, in one preferred embodiment, is done by cooling by thermal contact of the insertion tool with cold plates or by placing them in a refrigerator or freezer, may be accomplished with volatile liquids, which would provide low friction insertion capabilities but little interference in subsequent adhesion. Such liquids can be a mist of solvents of the adhesive used (which subsequently evaporate) with the heat, which in the cases of the waxes suggested above, could be the very solvents used for residual cleanup. One can even use pressure sensitive adhesives, in spite of the previously stated disadvantages, which when cooled as, e.g., with gaseous freezing mixtures such as carbon dioxide, will readily slide into the toner cartridges, and adhere upon the evaporation of the solid carbon dioxide and any condensed moisture or ice.

Methods of electrically heating the insertion tool that must be both stiff and thin makes a reliable design difficult. Past designs have used what is commonly referred to as a printed circuit heater, which must be laminated to and insulated from the metallic portions of the insertion tool, resulting in reduced stiffness of the insertion tool. They are expensive to manufacture, must have an attached cable and are easily damaged, considering that significant force is required to insert a folded seal into the cartridge. To the extent one tries to maximize the thickness of the insertion tool, one must minimize the seal and adhesive thicknesses. Thus, manufacturers of replacement seals have chosen to typically use 2-mil-thick (about 0.005 cm), seal material and 1 mil (about 0.0025 cm) adhesive thicknesses, which have had a propensity to tear, or, use the much thicker DuPont Tyvek™ material, which makes the use of an insertion tool thicker than 15 mils (about 0.038 cm) undesirable or impossible. The use of a 3-mil-thick (about 0.0076 cm) polyester seal material essentially eliminates all tearing problems (when used with a wax-based, "soft" adhesive of 2 to 5 mils (about 0.005 to 0.012 cm), thickness). Hence, the preferred insertion tool for this invention, when both high production and high reliability are desired, is illustrated as tool 40 in FIG. 4, which is a specialized form of the insertion tool 20 illustrated in FIG. 2.

Referring to FIG. 4, blade 41, preferentially made of hardened spring or stainless steel but also having high magnetic permeability, i.e., readily attracted by a magnet, provides the structural means for inserting the folded seal into the cartridge slot in the manner similar to that of the insertion tool 20 shown in FIG. 2. Unlike the insertion tool 20, blade 41 is cut nearly through its whole length by slit 42, which is typically 100 mils (about 0.25 cm) wide and ending approximately 0.5 inches (about 1.27 cm) from the end of blade 41, resulting in blade 41 forming a "U". In spite of this slit 42, the stiffness of tool 40 in the direction such a tool bends in use is substantially similar to an unslit tool. Four metal strips 43, which are significantly more electrically conductive than spring or stainless steel, such as copper, bronze or brass, are attached to the open end of the U of blade 42, forming terminals 44. This attachment is preferentially made via soldering or brazing, so as to provide good electrical contact between these metal strips 43 and blade 41. Approximately 0.75 inches (about 1.9 cm) from the ends of terminals 44, thermally insulating handles 45 are applied, such handles 45 being composed of cork, wood or similar nonconductive material.

In use, the room temperature or even cooled tool 40 is used to insert a folded seal into a cartridge. However, at this point, rather than removing tool 40 and inserting a heated insertion tool, as previously described, tool 40, with the cartridge attached to it, is inserted, via its terminals 44, into the receptacle of a low-voltage power supply. This power supply (not shown) should typically be capable of supplying from 1 to 3 volts AC at approximately 50 to 100 amperes, which will cause the blade 41 to heat to the desired temperature required for softening or melting the adhesive. With the design.shown, nearly all of the heating occurs in a uniform manner just beyond and not under handles 45, in the portion of blade 41 normally inserted into the cartridge. The design of the power supply including timing circuits to provide temperature control, are within the ordinary skill of the art. Upon completion of the heating cycle, typically taking from 5 to 15 seconds to reach temperatures of 150 to 200° F. (about 65° to 93° C.), determined by the thickness and type of metal used in manufacturing blade 41, tool 40, while still attached to the cartridge and seal, may be removed from the power supply and another such unit attached to repeat this cycle with another cartridge. Tool 40 is not immediately removed from the cartridge upon the completion of the heating cycle, but allowed to cool somewhat so that the adhesive adheres the seal to the cartridge gasket. Because of the simplicity and low manufacturing costs of this insertion tool, multiple insertion tools utilizing one power supply are practical and valuable to the practitioner of this invention.

It is often desirable or necessary to exert some force on the seal against the gasket, when the adhesive is cooling, to affect a leakproof seal. With reference to FIG. 51 utensil 50, in conjunction with tool 40 in FIG. 4, is designed to bring about such a force, whether one wishes to push the gasket against the seal or pull the seal against the gasket. Utensil 50 consists of handle 51 attached to rod 52, which, at its bent end, is attached to a strong permanent magnet 53. Utensil 50 can be used in the manner that the wooden spatula (previously described) was used to push against portions of the gasket in a CX cartridge. However, this tool can also be used to pull the seal towards the gasket by inserting utensil 50 into the cartridge through hole 35 in FIG. 3. The magnet 53 will exert its attraction through the seal material and pull on the portions of blade 41 (FIG. 4), when blade 41 is made from high-magnetic-permeability metal, forcing the seal against the gasket of the cartridge. With the use of rare earth magnets, such as neodymium-iron-boron magnets, whose dimensions need only be 0.5 inches (about 1.27 cm) in diameter and 0.25 inches (about 0.635 cm) thick, I have found one is capable of exerting sufficient force during the cooling cycle to fully attract the seal, with its adhesive, against the gasket.

It is sometimes not totally sufficient or even possible to insert a manually operated magnet tool, such as utensil 50 shown in FIG. 5, inside the cartridge to affect intimate contact between the seal and gasket of a toner cartridge, which is usually done subsequent to the heating of blade 41 of FIG. 4 and melting of the adhesive 16 of FIG. 1. For example, some cartridge designs are such that the toner fill hole of the cartridge is totally or partially obscured by various components of a cartridge assembly, which one would prefer not to disturb. In other instances, such as when the gasket of a cartridge is not level but wavy, either due to manufacturing variations or distortion caused during a previous recharging operation by excessive force or heat, the use of a point source of magnetic force, such as that provided by the manually operated magnet tool, utensil 50 in FIG. 5, may not readily produce a satisfactory hermetic seal. This can be due to the fact that a relatively constant, and not momentary, pressure between some or all of the seal and gasket is required during the cooling cycle to affect the desired bonding and hermetic sealing.

One solution to providing a constant force over an extended area is to slide a long bar magnet inside the cartridge which will attach itself to the gasket-seal-insertion and/or sealing tool combination, pulling these units together. This approach, however, does not allow for pulling the insertion and/or sealing tool downwards on one side and/or ends and upwards on the other side and/or ends, a condition sometimes desired to best seal certain cartridges, such as in the SX cartridge. More importantly, the overall width of the seal-gasket combination often requires the insertion of two bar magnets into the cartridge fill hole, a cumbersome and often not very successful endeavor because of the much greater attractive forces of the two bar magnets towards each other rather than to the insertion and/or sealing tool. Mechanically separating the two magnets prior to inserting them into the fill hole is typically not a solution because the resulting width of that combination of magnets would normally exceed the size or opening of the fill hole.

FIG. 6 is a cross sectional view of a toner cartridge, similar to FIG. 3, but viewed at the front or entrance part of the toner cartridge, whereas FIG. 3 is a cross sectional view looking from the side of the toner cartridge. FIG. 6 also includes a partial schematic illustration for magnet assembly 60, which has assembly base 61 and magnets 62. In this embodiment, magnets 62 are externally located, but in close proximity to the cartridge, which, when used in conjunction with a high magnetic permeability insertion tool and/or sealing blade 21, causes the blade to apply continuous pressure between seal 10 and gasket 34 providing intimate contact during the adhering step, such as in the cooling cycle of hot-melt adhesive 16. In another embodiment, the adhesive can be a pressure sensitive adhesive. Magnetic force lines 63 are depicted as dashed lines, indicating the typical path of these lines when blade 21 is inserted into the cartridge, the lines of force, so deflected from the otherwise cylindrical pattern of a magnet in air, causing a force on blade 21 towards gasket 34.

Figure 8:
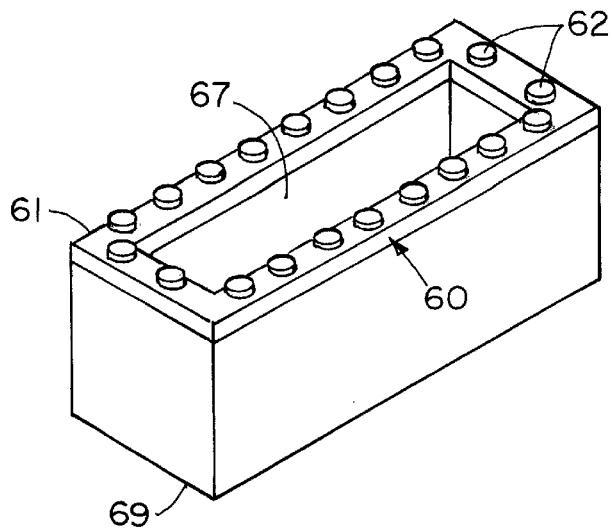
FIG. 8 is a perspective view of a magnet assembly for use in the resealing method of this invention.
Figure 9:
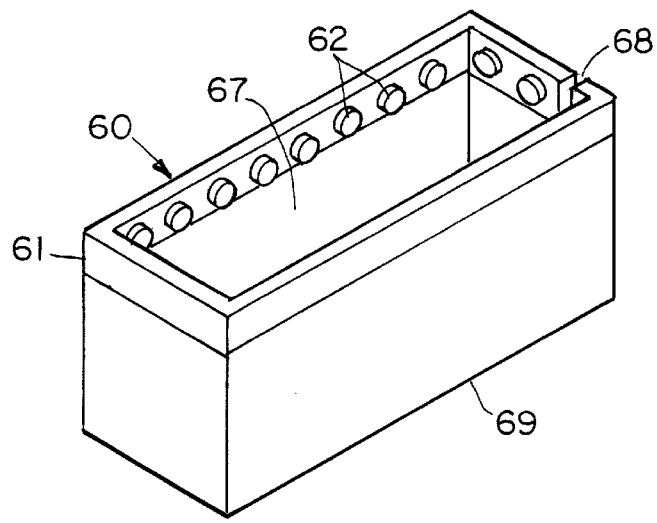
FIG. 9 is a perspective view of a second magnet assembly for use in the resealing method of this invention.

As shown in FIGS. 8 and 9, the magnet assembly 60 can surround the cartridge on all sides and is typically formed of assembly base 61 of high permeability iron bar stock and magnets 62. Magnet assembly 60 is disposed on base 69, which is a plastic, wood or similar structural material serving as a support structure for holding the magnet assembly 60 and the toner cartridge. Assembly base 61 can have slot 68 for allowing a toner cartridge with any protrusions to be inserted into the assembly base while allowing the magnets to be positioned proximate to the toner cartridge. The magnets at each end of base 61 can be one or two in number, but at the sides of the toner cartridge as many as eight or more magnets may be distributed. A significant fall-off of magnetic force occurs with distance between magnets 35 and blade 21. These distances vary because of different cartridge designs as well as the variations depending on the location of the magnets around the perimeter of the given cartridge. A preferred magnet material is neodymium-iron-boron. A preferred size of the magnets is about 0.2 to 0.25 inches (about 0.5 to 0.64 cm) high by about 0.25 to 0.5 inches (about 0.5 to 1.27 cm) in diameter, with energy products typically of 27 MGOe (megagauss oersteads) and the magnets are spaced about an inch (about 2.54 cm) apart. Such magnets are available from SGM Armatek, Inc. of Warminster, Pa. In another embodiment, the magnets can continuously line the perimeter of the opening 67 of magnet assembly 60. Alternatively, the magnetic force can be provided by an electromagnet. The representation of the magnet configuration shown in FIGS. 6 and 8 is particularly effective for the EX series of cartridges, where tool 10 is inserted close to the outside lips of the cartridge and the maximum forces result with such a configuration.

Figure 7:
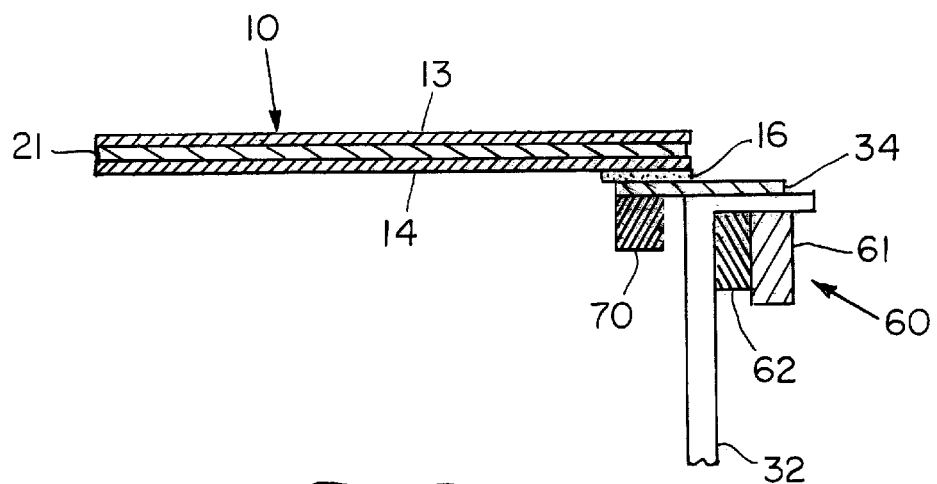
FIG. 7 is a partial end cross-sectional view of a third toner cartridge illustrating a seal formed by still another embodiment of the sealing method of this invention.

Because of the geometry of some cartridges, it is sometimes advantageous to rotate the magnets 62, on assembly base 61, usually ninety degrees, i.e., having the magnets face the inside of the cartridge, as shown in FIGS. 7 and 9, in order to maximize the force of the blade 21 against gasket 34. This inward facing magnet structure is particularly advantageous for fixtures used for the SX and NX cartridges, where the blade-gasket interface is not adjacent to the outside lips 65,66 of cartridge upper section 31 and lower section 32.

The use of externally mounted magnets operating in conjunction with high permeability blades, as described in this invention, while highly effective in providing the force required to compress the adhesive layer between the blade and the gasket, does not preclude the use of one or more internal magnets in conjunction with external magnets. Such a condition can occur when a gasket is badly distorted, or a cartridge is such that said combination of external and internal magnets is the only practical approach to provide the required intimate contact between seal and gasket with the adhesive between them.

For any new cartridge or seal developments, or for applications with the currently available cartridges, which can require an opposite direction of force from that resulting from a magnet locations shown in FIG. 6 and FIG. 7, some or all of the magnets surrounding the cartridge can be located above lip 65 of upper section 31 of toner cartridge 30, thereby producing a force pulling blade 21 in the direction toward lip 65.

As shown in FIG. 7, prior to a cartridge being placed in the magnet assembly 60, second magnet 70 can be placed within a toner cartridge with blade 21 and seal 10. Depending on the polarity of second magnet 70 to magnet 62, an additional force results from the attraction or repulsion between magnet 62 and second magnet 70, thereby pulling or pushing the blade down or up, respectively.

Figure 10:
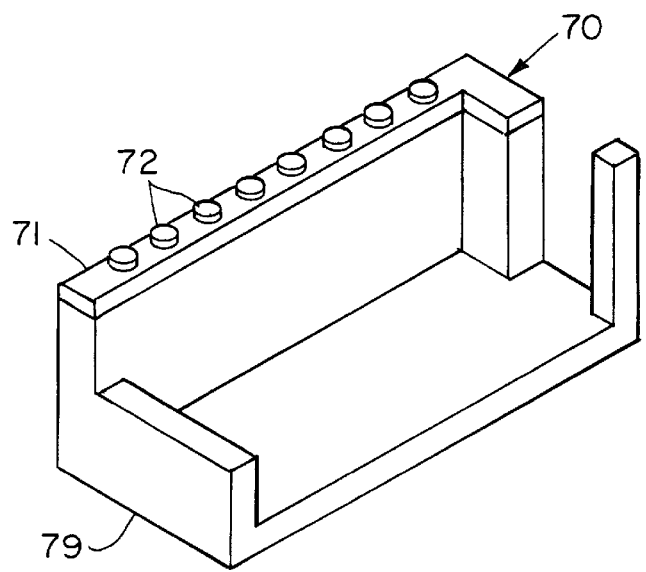
FIG. 10 is a perspective view of a third magnet assembly for use in the resealing method of this invention.

In some instances, the magnet assembly 60, as shown in FIG. 8, cannot surround the tone cartridge on all sides. For example, a 5Si or WX series cartridge from Canon Corporation, which is used in a Hewlett Packard LaserJet Tone Cartridge C3909A, has a portion of the sealing area that is not sufficiently proximate to the magnet assembly 60 to assist in sealing. Therefore, as shown in FIG. 10, another embodiment of the invention is suitable for sealing a WX cartridge. Magnet assembly 70 can have assembly base 71 of high permeability iron bar stock and magnets 72, which line a portion of the perimeter, such as one or more sides as required for proper sealing, that corresponds to the shape of a toner cartridge. Magnet assembly 70 is disposed on base 79, which is a plastic, wood or similar structural material serving as a support structure for holding the magnet assembly 70 and the tone cartridge. Assembly base 70 and base 79 can have slots or cuts for allowing a toner cartridge with any protrusions to be inserted into the assembly base while allowing the magnets to be positioned proximate to the cartridge and at least a portion of the sealing area.

For a cartridge such as the WX, the remaining portion of the cartridge sealing can be done with a magnet on the tool (utensil 50) as shown in FIG. 5, either externally or internally as necessary. In a preferred embodiment, where a substantial length of the sealing area needs to be exposed to the magnets that cannot be positioned on the base assembly 70 a "comb" arrangement can be used, as shown in FIG. 11.

Comb assembly 80 is typically formed of comb assembly base 81 having high permeability steel stock and magnets 82. Magnets 82 can be the same as magnets 72 used on base assembly 70. Comb assembly 80 has prongs 84 on which magnets 82 are positioned and prongs 84 are separated by slots 85. Comb assembly 80 has handle 83 for holding comb assembly. In another embodiment, comb assembly 80 does not have prongs. In this example, magnets 82 can be positioned along an edge of the comb assembly base 81. Prongs 84 and slots 85 are sized to allow magnets 82 to be placed around support members of the toner cartridge and proximate to the sealing area. Prongs 84 can number one, two, three or more. In one embodiment, comb assembly base 81 has eight magnets 82 and eight prongs 84. Although it is preferred that each prong have a magnet, it is sometimes not necessary to have a magnet on each prong to reseal the cartridge. Prongs 84 can have a width of between about 1.1 and 1.4 inches (about 3 and 3.5 cm). In the same embodiment, slots 85 are about 0.25 inches (about 0.6 cm) wide and about 1.25 inches (about 3.1 cm) deep. Comb assembly base 81 can be about 2.5 inches (about 6.4 cm) wide and about 11.5 inches (about 29.2 cm) long with a thickness of about 0.02 inches (0.05 cm) or greater.

Figure 12:
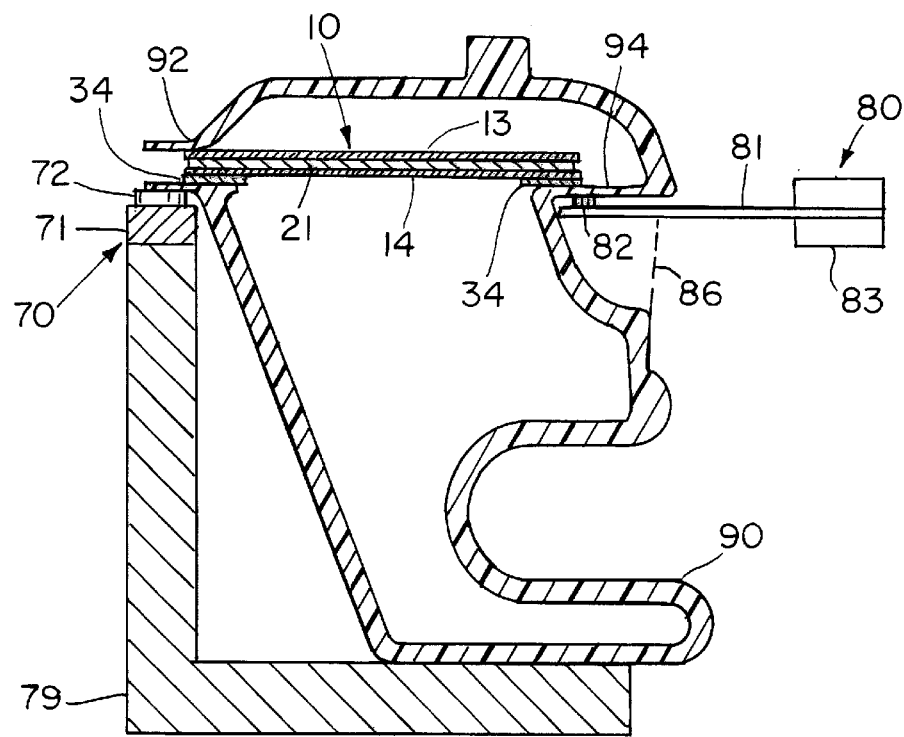
FIG. 12 is a partial end cross-sectional view of a fourth toner cartridge illustrating a seal formed by still another embodiment of the sealing method of this invention.

FIG. 12 shows a cross-sectional view of a toner cartridge, similar to FIG. 6, from an end part of the toner cartridge. FIG. 12 also includes a partial schematic illustration for magnet assembly 70, which has assembly base 71 and magnets 72. In this embodiment, magnets 72 are externally located, but in close proximity to the cartridge 90 at first side 92, which, when used in conjunction with a comb assembly 80 on second side 94 of sealing area, causes blade 21 to apply pressure between seal 10 and gasket 34 providing intimate contact during the adhering step. Slots 85 allow comb assembly 80 to avoid contact with member supports 86 of toner cartridge so that magnets 82 can be brought proximate to sealing area to sealing area and can apply pressure between seal 10 and gasket 34.

Figure 11:
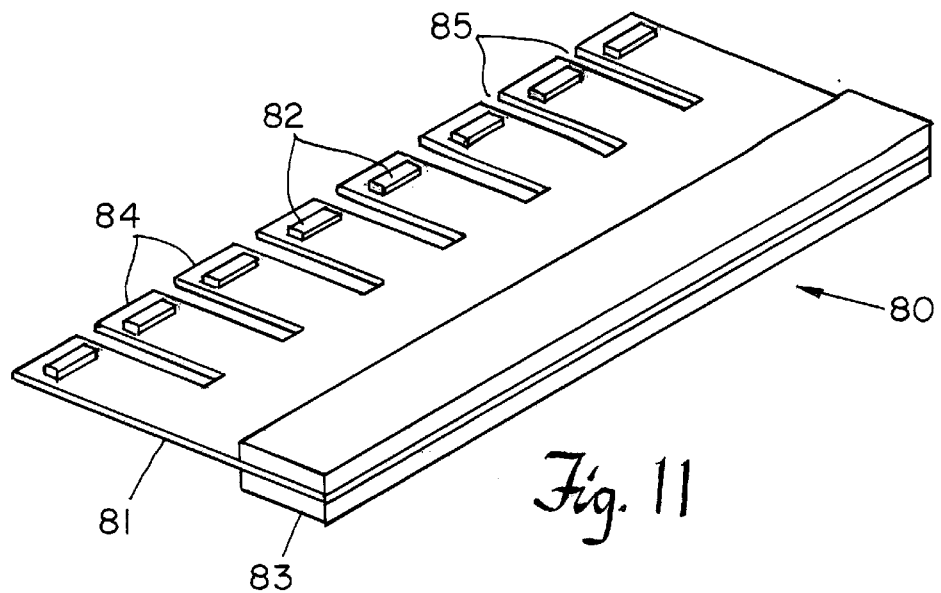
FIG. 11 is a schematic illustration of a tool for providing pressure between the seal and its adhesive and the gasket within the cartridge.

In another embodiment, depending on the type of toner cartridge employed, magnet assembly can have no magnets on a base but can use the devices shown in FIGS. 5 and 11 or equivalent configurations to provide the magnets for sealing. The base would be used for holding and positioning the cartridge.

Equivalents

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A method for resealing a toner cartridge having its original seal removed so that the toner cartridge can be recharged with toner and reused, comprising the steps of:
    a) sliding into the cartridge a folded plastic strip having an upper portion and a lower portion and a shape corresponding to the original seal within the cartridge, said folded plastic strip having an adhesive on its outer surface at least corresponding with a sealing area of the original seal;
    b) inserting a magnetically permeable blade of a sealing tool between the upper portion and lower portion of the folded plastic strip; and
    c) applying to the toner cartridge a magnetic force to the blade within the toner cartridge, wherein the blade applies a force to the plastic strip through the adhesive to said sealing area and the adhesive bonds to a sealing surface of the cartridge, thereby resealing the toner cartridge.

2. The method of claim 1 wherein the magnetic force is applied by placing the toner cartridge on an assembly base, said base having an opening and interior for receiving a section of a toner cartridge, said opening having a perimeter that corresponds to the shape of the section of the toner cartridge and having magnets disposed about the perimeter for positioning the sealing area of the original seal of said toner cartridge proximate to the magnets.

3. The method of claim 1 wherein the magnetic force is applied with an assembly base having an opening for receiving a section of a toner cartridge, said opening having at least one side that corresponds to at least one portion of the shape of a section of the toner cartridge and having magnets disposed about a portion of the perimeter of at least one side of the opening that corresponds to the shape of the toner cartridge for positioning said sealing area of the original seal of said toner cartridge proximate to the magnets.

4. The method of claim 1 wherein the magnetic force is applied by an assembly base having a handle; a plurality of prongs extending from said assembly base; and at least one magnet disposed on each prong.

5. The method of claim 1 wherein the magnetic force is applied by an apparatus having:
    I) a first assembly base having an opening for receiving a section of a toner cartridge, said opening having at least one side that corresponds to at least one portion of the shape of a section of the toner cartridge and having magnets disposed about a portion of the perimeter of at least one side of the opening that corresponds to the shape of the toner cartridge for positioning said sealing area of the original seal of said toner cartridge proximate to the magnets; and
    ii) a second assembly base having a handle, a plurality of prongs extending from said second assembly base and at least one magnet disposed on each prong for resealing a portion of the seal of said toner cartridge.

6. The method of claim 1 wherein said adhesive is a hot-melt adhesive.

7. The method of claim 1 wherein said adhesive is a pressure sensitive adhesive.

8. The method of claim 1 wherein said magnetic force is applied by neodymium-iron-boron magnets.

9. A method for resealing a toner cartridge having its original seal removed so that the toner cartridge can be recharged with toner and reused, comprising the steps of:

a) inserting a magnetically permeable blade of a sealing tool between a folded plastic strip having an upper portion and lower portion and a shape corresponding to the original seal, said folded plastic strip having a hot-melt adhesive on the outer surface at least corresponding with a sealing area of the original seal;

b) sliding the folded plastic strip having the upper portion and the lower portion and the shape corresponding to the original seal into said sealing area within the cartridge, wherein said hot-melt adhesive is in contact with said sealing area;

c) heating the blade to cause the hot-melt adhesive conforming with said sealing area of the original seal to soften while not distorting the toner cartridge; and d) applying to the toner cartridge a magnetic force to the blade within the toner cartridge, wherein the blade applies a force to the plastic strip through the adhesive to said sealing area and the adhesive bonds to a sealing surface of the cartridge, thereby resealing the toner cartridge.

10. The method of claim 9 wherein the magnetic force is applied by placing the toner cartridge on an assembly base, said base having an opening and interior for receiving a section of a toner cartridge, said opening having a perimeter that corresponds to the shape of the section of the toner cartridge and having magnets disposed about the perimeter for positioning the sealing area of the original seal of said toner cartridge proximate to the magnets.

11. The method of claim 9 wherein the magnetic force is applied with an assembly base having an opening for receiving a section of a toner cartridge, said opening having at least one side that corresponds to at least one portion of the shape of a section of the toner cartridge and having magnets disposed about a portion of the perimeter of at least one side of the opening that corresponds to the shape of the toner cartridge for positioning said sealing area of the original seal of said toner cartridge proximate to the magnets.

12. The method of claim 9 wherein the magnetic force is applied by an assembly base having a handle; a plurality of prongs extending from said assembly base; and at least one magnet disposed on each prong.

13. The method of claim 9 wherein the magnetic force is applied by an apparatus having:

I) a first assembly base having an opening for receiving a section of a toner cartridge, said opening having at least one side that corresponds to at least one portion of the shape of a section of the toner cartridge and having magnets disposed about a portion of the perimeter of at least one side of the opening that corresponds to the shape of the toner cartridge for positioning said sealing area of the original seal of said toner cartridge proximate to the magnets; and ii) a second assembly base having a handle, a plurality of prongs extending from said second assembly base and at least one magnet disposed on each prong for resealing a portion of the seal of said toner cartridge.

14. The method of claim 9 wherein said magnetic force is applied by neodymium-iron-boron magnets.

15. A method for resealing a toner cartridge having its original seal removed so that the toner cartridge can be recharged with toner and reused, comprising the steps of:

a) inserting a blade of a sealing tool between a folded plastic strip having an upper portion and lower portion and a shape corresponding to the original seal, said folded plastic strip having a hot-melt adhesive on its outer surface that at least corresponds with a sealing area of the original seal;

b) sliding said blade with the folded plastic strip having the upper portion and the lower portion and the shape corresponding to the original seal into said sealing area within the cartridge, wherein said hot-melt adhesive is in contact with said sealing area;

c) heating said blade sufficiently to cause the hot-melt adhesive to soften while not distorting the toner cartridge; and d) withdrawing the blade of the sealing tool, whereby the hot-melt adhesive cools and bonds to a sealing surface of the toner cartridge, thereby resealing the toner cartridge.

16. A method for resealing a toner cartridge having its original seal removed so that the toner cartridge can be recharged with toner and reused, comprising the steps of:

a) sliding a folded plastic strip having an upper portion and a lower portion and a shape corresponding to the original seal into a sealing area within the cartridge with a U-shaped blade of a sealing tool inserted between the folded plastic strip, said folded plastic strip having a hot-melt adhesive on its outer surface that at least corresponds with said sealing area of the original seal, wherein said hot-melt adhesive is in contact with said sealing area;

b) heating the U-shaped blade of the sealing tool sufficiently to cause the hot-melt adhesive to soften while not distorting the toner cartridge; and c) withdrawing the U-shaped blade of the sealing tool, whereby the hot-melt adhesive cools and bonds to a sealing surface of the toner cartridge, thereby resealing the toner cartridge.

\* \* \* \* \*